US012620853B2

(12) United States Patent
Ono et al.

(10) Patent No.: US 12,620,853 B2
(45) Date of Patent: May 5, 2026

(54) ROTATING ELECTRIC MACHINE AND METHOD FOR MANUFACTURING ROTOR

(71) Applicant: HONDA MOTOR CO., LTD., Tokyo (JP)

(72) Inventors: Yuji Ono, Wako (JP); Keiji Tada, Wako (JP); Tsutomu Yoshino, Wako (JP); Kimiaki Nakamura, Wako (JP); Kaoru Tomioka, Wako (JP); Tomoya Otani, Wako (JP); Koichi Oku, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 286 days.

(21) Appl. No.: 18/330,464

(22) Filed: Jun. 7, 2023

(65) Prior Publication Data

US 2023/0402890 A1 Dec. 14, 2023

(30) Foreign Application Priority Data

Jun. 9, 2022 (JP) ................................. 2022-093531

(51) Int. Cl.
| | |
|---|---|
| *H02K 1/28* | (2006.01) |
| *H02K 1/278* | (2022.01) |
| *H02K 15/03* | (2025.01) |
| *H02K 15/035* | (2025.01) |

(52) U.S. Cl.
CPC .............. *H02K 1/28* (2013.01); *H02K 1/278* (2013.01); *H02K 15/03* (2013.01); *H02K 15/035* (2025.01)

(58) Field of Classification Search
CPC .......... H02K 1/28; H02K 1/278; H02K 15/03; H02K 15/035; H02K 15/12
See application file for complete search history.

(56) References Cited

U.S. PATENT DOCUMENTS

| | | | | |
|---|---|---|---|---|
| 11,863,047 | B2 * | 1/2024 | Kouda | H02K 21/16 |
| 12,021,422 | B2 * | 6/2024 | Tamura | H02K 5/1737 |
| 2018/0316247 | A1 * | 11/2018 | Andonian | H02K 15/03 |
| 2019/0036430 | A1 * | 1/2019 | Takano | H02K 1/278 |
| 2019/0047684 | A1 * | 2/2019 | Linde | B64C 21/10 |
| 2020/0119606 | A1 * | 4/2020 | Murakami | H02K 15/12 |
| 2021/0384786 | A1 * | 12/2021 | Tamura | H02K 1/278 |

(Continued)

FOREIGN PATENT DOCUMENTS

| | | | | |
|---|---|---|---|---|
| CN | 107078572 B | * 11/2019 | ............. | H02K 15/03 |
| EP | 2012409 A2 | * 1/2009 | ............. | H02K 1/145 |

(Continued)

OTHER PUBLICATIONS

Translation of CN-107078572-B (Year: 2019).*

(Continued)

*Primary Examiner* — Jeffrey T Carley

(74) *Attorney, Agent, or Firm* — Rankin, Hill & Clark LLP

(57) ABSTRACT

A rotor constituting a rotating electric machine includes a rotating shaft and a permanent magnet. A sleeve covering the outer surface of the permanent magnet is attached to the rotating shaft. A resin coating layer is formed on an outer circumferential wall of the sleeve. The resin coating layer includes a base portion and a plurality of ridges formed on the outer circumferential wall of the base portion. A riblet recessed relative to the plurality of ridges is formed between the plurality of ridges.

8 Claims, 13 Drawing Sheets

(56)                    References Cited

U.S. PATENT DOCUMENTS

| | | | |
|---|---|---|---|
| 2023/0094490 A1* | 3/2023 | Ono | H02K 1/278 |
| | | | 310/156.28 |
| 2025/0246952 A1* | 7/2025 | Onizuka | H02K 1/27 |

FOREIGN PATENT DOCUMENTS

| | | | | |
|---|---|---|---|---|
| FR | 2943859 A1 * | 10/2010 | | H02K 1/2781 |
| JP | 11-150896 A | 6/1999 | | |
| JP | 2014-50133 A | 3/2014 | | |
| JP | 2020-175603 A | 10/2020 | | |
| WO | WO-2020209050 A1 * | 10/2020 | | H02K 7/14 |

OTHER PUBLICATIONS

Translation of FR-2943859-A1 (Year: 2010).*
Translation of WO-2020209050-A1 (Year: 2020).*
Japanese Office Action dated Sep. 2, 2025 issued in corresponding Japanese application No. 2022-093531; English machine translation included (6 pages).

* cited by examiner

ROTATING ELECTRIC MACHINE AND METHOD FOR MANUFACTURING ROTOR

CROSS-REFERENCE TO RELATED APPLICATIONS

This application is based upon and claims the benefit of priority from Japanese Patent Application No. 2022-093531 filed on Jun. 9, 2022, the contents of which are incorporated herein by reference.

BACKGROUND OF THE INVENTION

Field of the Invention

The present invention relates to a rotating electric machine including a rotor and a stator. The present invention also relates to a method of manufacturing a rotor constituting a rotating electric machine.

Description of the Related Art

A rotating electric machine including a rotor and a stator disposed outside of the rotor is known. In this case, the rotor has permanent magnets provided on an outer circumferential wall of the rotating shaft. To prevent the permanent magnets from falling off the rotating shaft, a sleeve is attached to the rotating shaft. The sleeve covers outer surfaces of the permanent magnets. The sleeve is formed of a carbon fiber reinforced polymer as described in, for example, JP 2020-175603 A.

A predetermined clearance is formed between the sleeve and the stator. Therefore, an air layer is interposed between the sleeve and the stator. When the rotating shaft rotates in this state, an air flow is generated around the sleeve. In the case that a rotational speed of the rotating shaft is low, the air flow is laminar. On the other hand, in the case of an aircraft or the like, it is assumed that a rotating shaft is rotated at a high speed. In this case, the air flow becomes turbulent. Under this condition, frictional resistance of the sleeve with respect to the air layer increases. As a result, so-called windage loss occurs. If the permanent magnet is heated due to the windage loss, the energy conversion efficiency of the rotating electric machine decreases.

In order to reduce windage loss, riblets may be formed on the outer circumferential wall of the sleeve. For example, in the prior art described in JP 2020-175603 A, a prepreg is deformed into a cylindrical shape to obtain a sleeve, and then a transfer film is wound around an outer circumferential wall of the sleeve. A convex pattern is formed in advance on the transfer film, and the convex pattern is transferred to the outer circumferential wall of the sleeve to form the riblets on the outer circumferential wall. Thereafter, the sleeve is thermally cured and the transfer film is removed from the sleeve.

JP H11-150896 A describes that an armoring made of a non-magnetic material is attached to an outer circumferential surface of a rotor. Annular convex portions for promoting heat dissipation are formed on the outer circumferential wall of the armoring. The annular concave portions recessed relative to the annular convex portions are grooves. According to the description of JP H11-150896 A, an increase in windage loss is suppressed by the grooves. Titanium is exemplified as the material of the armoring.

SUMMARY OF THE INVENTION

It is not easy to form a fine structure in a prepreg with high dimensional accuracy. Therefore, even if fine irregularities are formed on the transfer film, it is not easy to transfer the fine irregularities to the prepreg. For this reason, it is difficult to obtain a sleeve made of a carbon fiber reinforced polymer and having fine grooves.

JP H11-150896 A describes depositing and fixing fine particles by thermal spraying or cold spraying in order to obtain an armoring having fine irregularities formed on the outer circumferential wall. However, based on such a method, it is not easy to obtain an armoring having rigidity enough to hold the permanent magnets. When a cylindrical body made of a metal such as titanium is used as an armoring, rigidity can be secured, but it is not easy to form fine irregularities on titanium or the like by machining or the like. Further, in this case, since the weight of the armoring is large, the weight of the rotor increases.

The present invention has the object of solving the aforementioned problems.

According to an embodiment of the present invention, there is provided a rotating electric machine including a rotor and a stator, the rotor including a rotating shaft and a permanent magnet held on the rotating shaft, and the stator including an electromagnetic coil surrounding the permanent magnet, wherein the rotor includes a sleeve covering an outer surface of the permanent magnet on the rotating shaft and being spaced apart from the stator by a predetermined distance, and a resin coating layer provided on an outer circumferential wall of the sleeve, and wherein the sleeve is made of a carbon fiber reinforced polymer, the resin coating layer includes a base portion covering the outer circumferential wall of the sleeve and a ridge structure protruding from an outer circumferential wall of the base portion, the ridge structure includes one or a plurality of convex portions forming a plurality of ridges extending parallel to each other, and a riblet recessed relative to the plurality of ridges is formed between the plurality of ridges.

According to another embodiment of the present invention, there is provided a method of manufacturing a rotor that includes a rotating shaft and a permanent magnet held on the rotating shaft and is surrounded by a stator in a rotating electric machine, the method including a sleeve attaching step of covering an outer surface of the permanent magnet by a sleeve made of a carbon fiber reinforced polymer, a resin coating step of coating an outer circumferential wall of the sleeve with a resin coating layer, and a ridge forming step of forming, in the resin coating layer, a base portion covering the outer circumferential wall of the sleeve and a ridge structure protruding from an outer circumferential wall of the base portion, by processing and removing a part of an outer circumferential wall of the resin coating layer, wherein in the ridge forming step, the ridge structure is provided as one or a plurality of convex portions forming a plurality of ridges that extend in parallel to each other, thereby forming a riblet recessed relative to the plurality of ridges.

Since it is difficult to process a sleeve made of a carbon fiber reinforced polymer, it is not easy to form the riblet (or ridges) in the outer circumferential wall of the sleeve. On the other hand, in the present invention, the riblet is formed in the resin coating layer covering the outer circumferential wall of the sleeve. Since the resin coating layer is a separate body from the sleeve, it is not necessary to perform processing such as machining on the sleeve. Therefore, the occurrence of breakage such as cracking in the sleeve is avoided.

The riblet can be easily formed by forming the ridges by performing processing such as machining on the resin coating layer. In addition, the resin coating layer is made of resin which is lighter than metal or the like. Therefore, an increase in the weight of the rotor is avoided.

The riblet reduces the turbulent vortex generated around the rotor even when the rotor rotates at a high speed. As a result, the turbulent flow friction viscosity is lowered and the generation of the Taylor vortex is suppressed. For the reasons described above, the windage loss can be reduced. As a result, the permanent magnet is prevented from heating up. Therefore, a decrease in the magnetic force of the permanent magnet is avoided, so that the energy conversion efficiency in the rotating electric machine is sufficiently increased.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 7 is another example of a cross-sectional view of ridges formed on the resin coating layer taken along the direction orthogonal to the extending direction of the ridges;

FIG. 10 is still another example of a cross-sectional view of ridges formed on the resin coating layer taken along the direction orthogonal to the extending direction of the ridges;

FIG. 12 is a cross-sectional view showing a main part in a state in which a resin coating layer is formed on an outer circumferential wall of the sleeve.

DETAILED DESCRIPTION OF THE INVENTION

In FIGS. 1 to 13, some components may be shown in an exaggerated manner for easy understanding. For this reason, FIGS. 1 to 13 do not show actual scales of the components.

Figure 1:
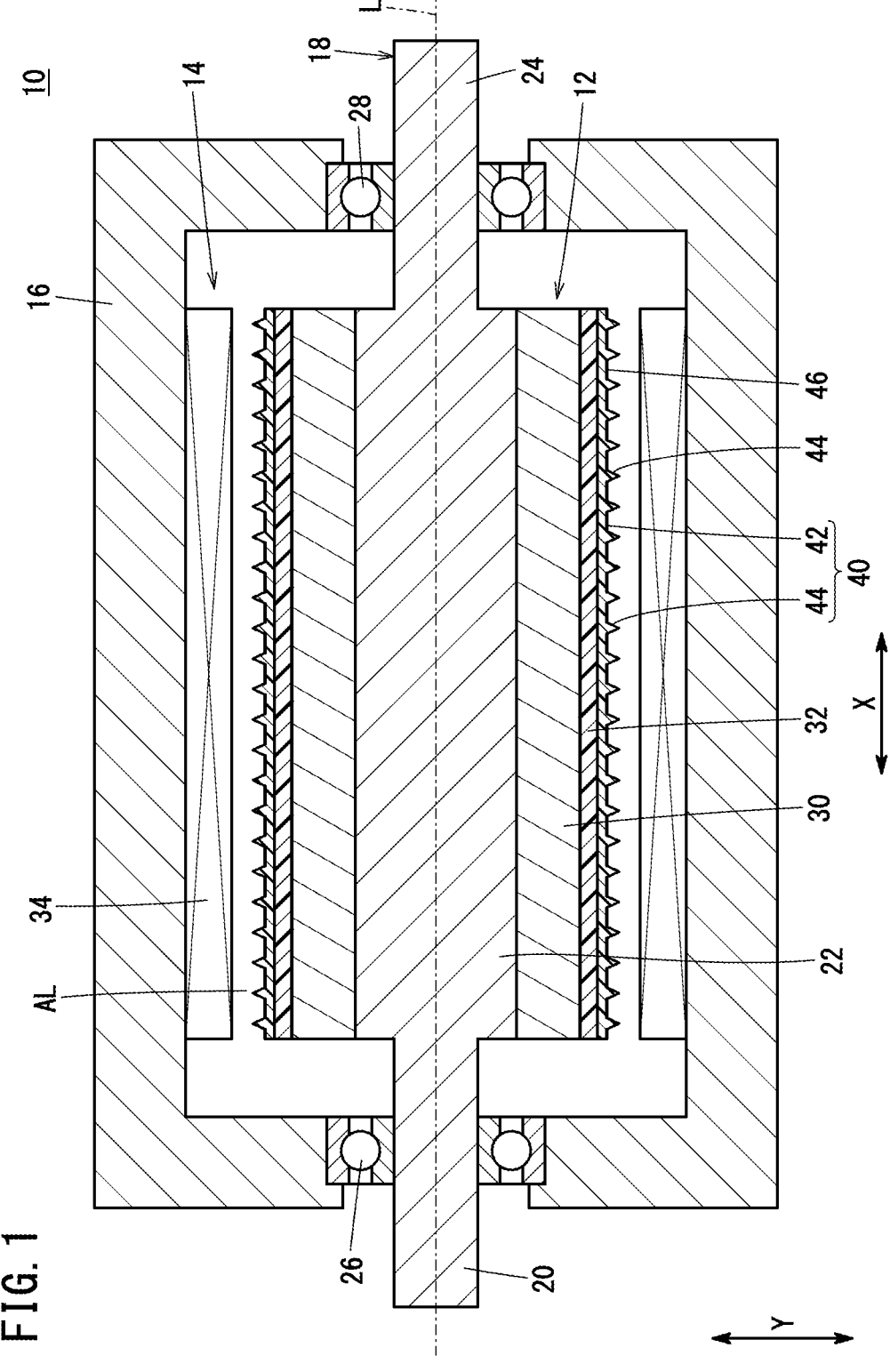
FIG. 1 is a schematic cross-sectional view of a rotating electric machine according to an embodiment of the present invention taken along an axial direction.

FIG. 1 is a schematic cross-sectional view of a rotating electric machine 10 according to the present embodiment taken along an axial direction (described later). The rotating electric machine 10 includes a rotor 12 and a stator 14. The stator 14 and most of the rotor 12 are housed in a casing 16.

The rotor 12 includes a rotating shaft 18. The rotating shaft 18 is a columnar body including a first small diameter portion 20, a large diameter portion 22, and a second small diameter portion 24. The centers of the first small diameter portion 20 and the second small diameter portion 24 coincide with the center of the large diameter portion 22. The direction in which the first small diameter portion 20, the large diameter portion 22, and the second small diameter portion 24 are arranged is an extending direction of the rotating shaft 18. Hereinafter, a line passing through the center of each of the first small diameter portion 20, the large diameter portion 22, and the second small diameter portion 24 and extending in the extending direction of the rotating shaft 18 may be referred to as an axis L, and a direction parallel to the axis L may be referred to as an axial direction. The axial direction is a direction of arrow X in FIG. 1. The diameters of the first small diameter portion 20, the large diameter portion 22, and the second small diameter portion 24 extend in a direction orthogonal to the axis L. Hereinafter, a direction in which the diameter extends may be referred to as a diametrical direction. The diametrical direction is a direction of arrow Y in FIG. 1.

The rotating shaft 18 is rotatably supported by the casing 16 via a first bearing 26 and a second bearing 28. Distal ends of the first small diameter portion 20 and the second small diameter portion 24 of the rotating shaft 18 are passed through the first bearing 26 and the second bearing 28, respectively, and are exposed from the casing 16. For example, a propeller or the like (not illustrated) is attached to a tip exposed from the casing 16.

Figure 2:
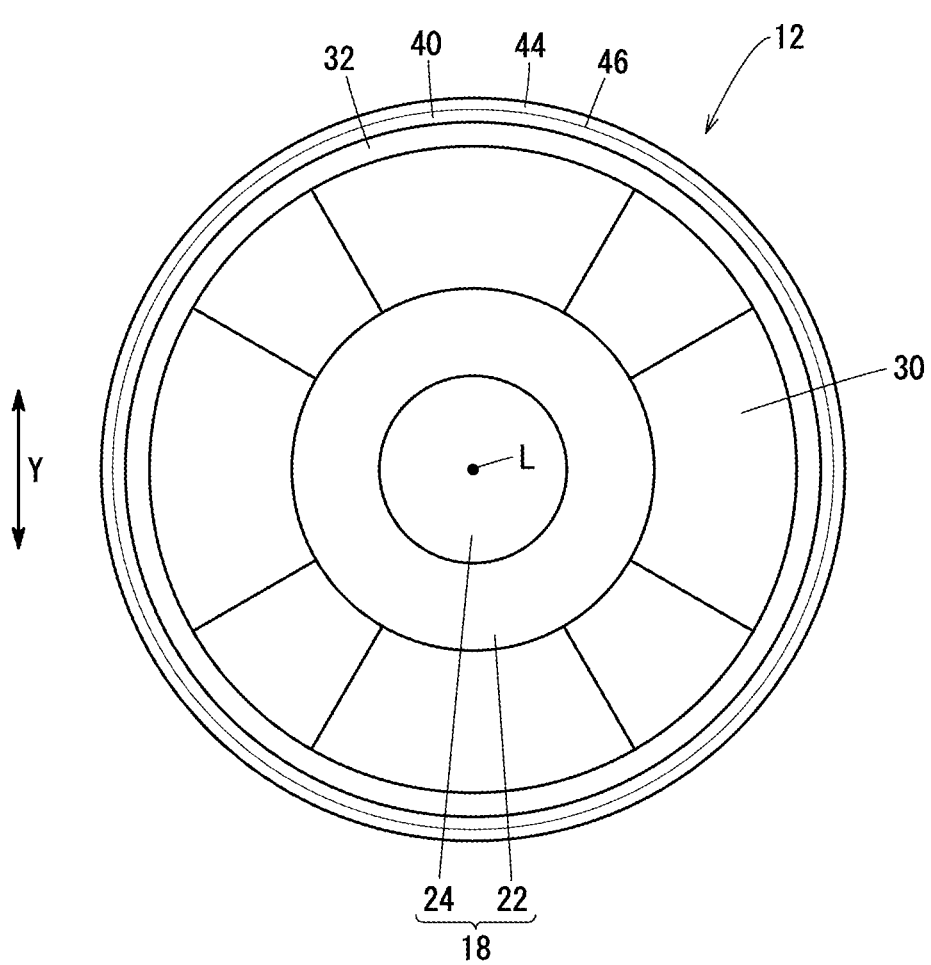
FIG. 2 is a schematic front view of the rotor when viewed in the axial direction.

As shown in FIGS. 1 and 2, permanent magnets 30 are disposed on an outer circumferential portion of the large diameter portion 22. The rotating shaft 18 is further provided with a sleeve 32. The sleeve 32 covers the outer surfaces of the permanent magnets 30. The sleeve 32 is formed of carbon fiber reinforced polymer or plastic (CFRP) and exhibits a certain degree of elasticity. The CFRP is formed by impregnating carbon fibers with a matrix resin. Preferable examples of the matrix resin include an epoxy-based resin. The glass transition temperature of the epoxy-based resin is typically around 180° C.

No external force is applied to the sleeve 32 before the rotating shaft 18 is inserted therethrough. This state is a so-called natural state. An inner diameter of the sleeve 32 in the natural state is slightly smaller than an outer diameter of the large diameter portion 22. Therefore, when the large diameter portion 22 is inserted into the sleeve 32, the sleeve 32 is elastically deformed so as to slightly expand in diameter. Thereafter, the sleeve 32 is slightly reduced in diameter based on the elastic restoring force. Due to this elastic restoring force, the sleeve 32 presses the permanent magnets 30 toward the rotating shaft 18. Based on this pressing, the permanent magnets 30 are held by the sleeve 32 on the outer circumferential portion of the rotating shaft 18. A thickness T1 (see FIG. 12) of the sleeve 32 is typically about 0.5 mm to 5 mm.

As shown in FIG. 1, the stator 14 includes an electromagnetic coil 34. The electromagnetic coil 34 is provided in a stator core (not shown). When the stator 14 is positioned and fixed to the casing 16 and the portions of the rotor 12 where the permanent magnets 30 are provided are housed in the casing 16, the electromagnetic coil 34 surrounds the permanent magnets 30 via the sleeve 32. When the permanent magnets 30 and the rotating shaft 18 integrally rotate, an alternating magnetic field is formed between the permanent magnets 30 and the electromagnetic coil 34.

As shown in FIGS. 1 and 2, a resin coating layer 40 is provided on the outer circumferential wall of the sleeve 32. The resin coating layer 40 covers the entire outer circumferential wall of the sleeve 32. As understood from FIG. 1, the sleeve 32 and the electromagnetic coil 34 are spaced apart from each other by a predetermined distance. Therefore, an air layer AL is interposed between the sleeve 32 and the electromagnetic coil 34.

The base resin of the resin coating layer 40 is preferably a resin that causes less wear of a cutting tool than CFRP when machining is performed on the base resin and CFRP under the same conditions. Specific examples of such a resin include an epoxy-based resin and a paraxylene-based resin. The resin coating layer 40 does not contain reinforcement fibers such as carbon fibers.

Figure 3:
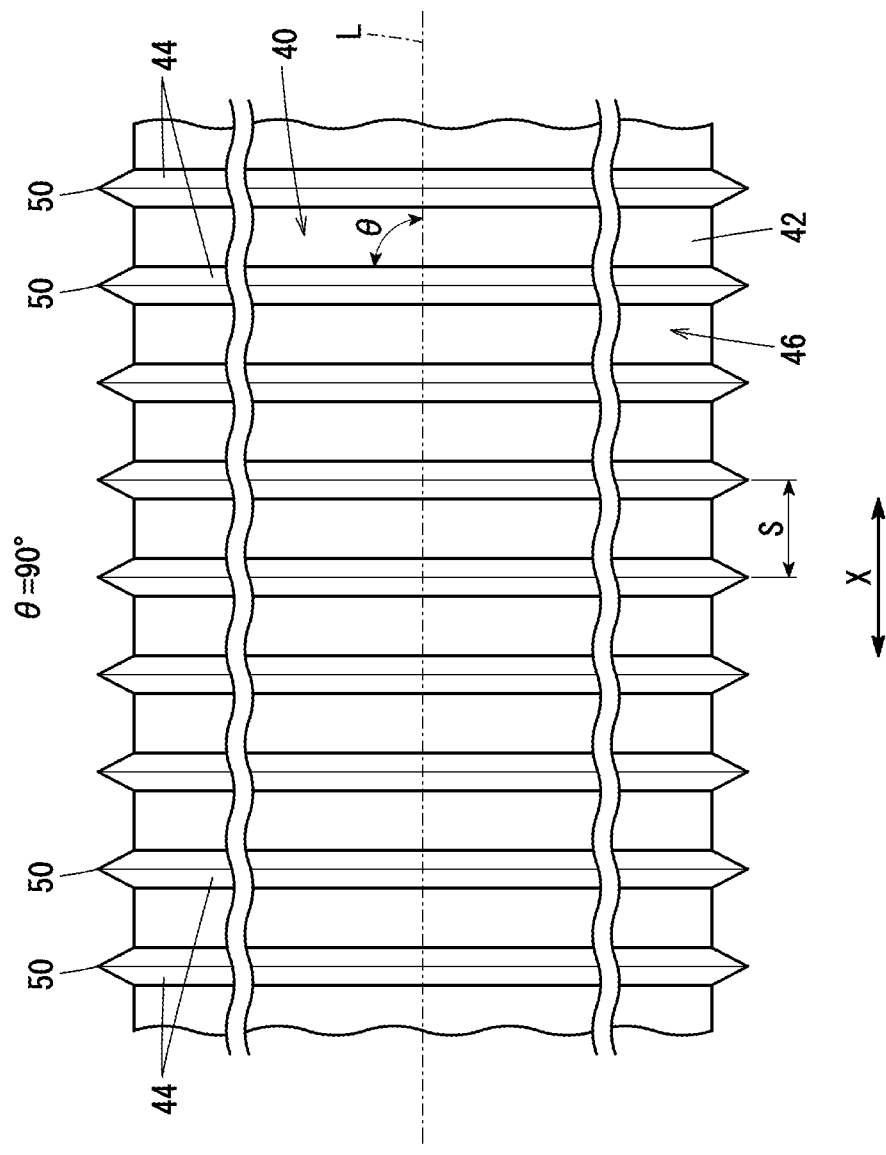
FIG. 3 is an example of an enlarged view of a main part of the resin coating layer when the rotating shaft of the rotor is viewed in a direction orthogonal to the axial direction.

FIG. 3 is an enlarged view of a main part of the resin coating layer 40 when the rotating shaft 18 is viewed in a direction orthogonal to the axial direction. The resin coating layer 40 includes a base portion 42 and a ridge structure formed on an outer circumferential wall of the base portion 42. In the embodiment shown in FIG. 3, the ridge structure includes a plurality of convex portions annularly projecting outward in the diametrical direction of the rotating shaft 18. One ridge 44 is formed by one convex portion. Therefore, the ridge structure shown in FIG. 3 has a plurality of ridges 44 formed of a plurality of convex portions. Since the plurality of convex portions are arranged so as to be separated from each other at substantially equal intervals, two adjacent ones among the plurality of ridges 44 extend in parallel to each other. A portion between two ridges 44 adjacent to each other is a groove recessed relative to the two ridges 44. That is, a plurality of grooves are formed in the resin coating layer 40. The plurality of grooves form riblets 46 that are recessed relative to the ridges 44.

In the embodiment shown in FIG. 3, each of the ridges 44 is perpendicular to the axial direction of the rotating shaft 18. That is, in this case, an intersection angle θ between the extending direction of the ridges 44 and the axial direction of the rotating shaft 18 is 90°. Therefore, the ridges 44 protrude outward in the diametrical direction of the rotating shaft 18 and the sleeve 32. However, the intersection angle θ may be 45° or more, and is not limited to 90°. The intersection angle θ may be, for example, 75° as shown in FIG. 4 or 60° as shown in FIG. 5.

Figure 4:
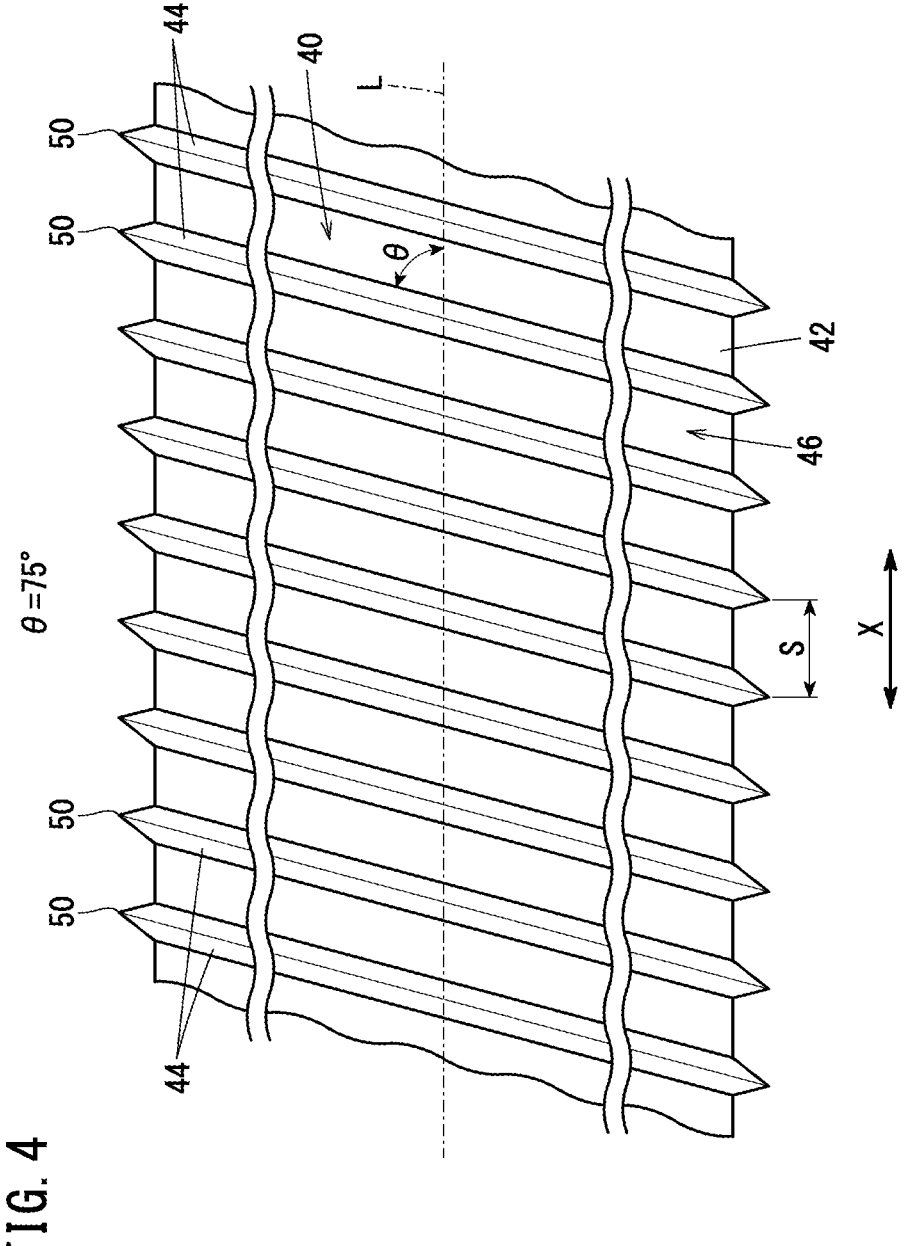
FIG. 4 is another example of an enlarged view of a main part of the resin coating layer when the rotating shaft of the rotor is viewed in the direction orthogonal to the axial direction.
Figure 5:
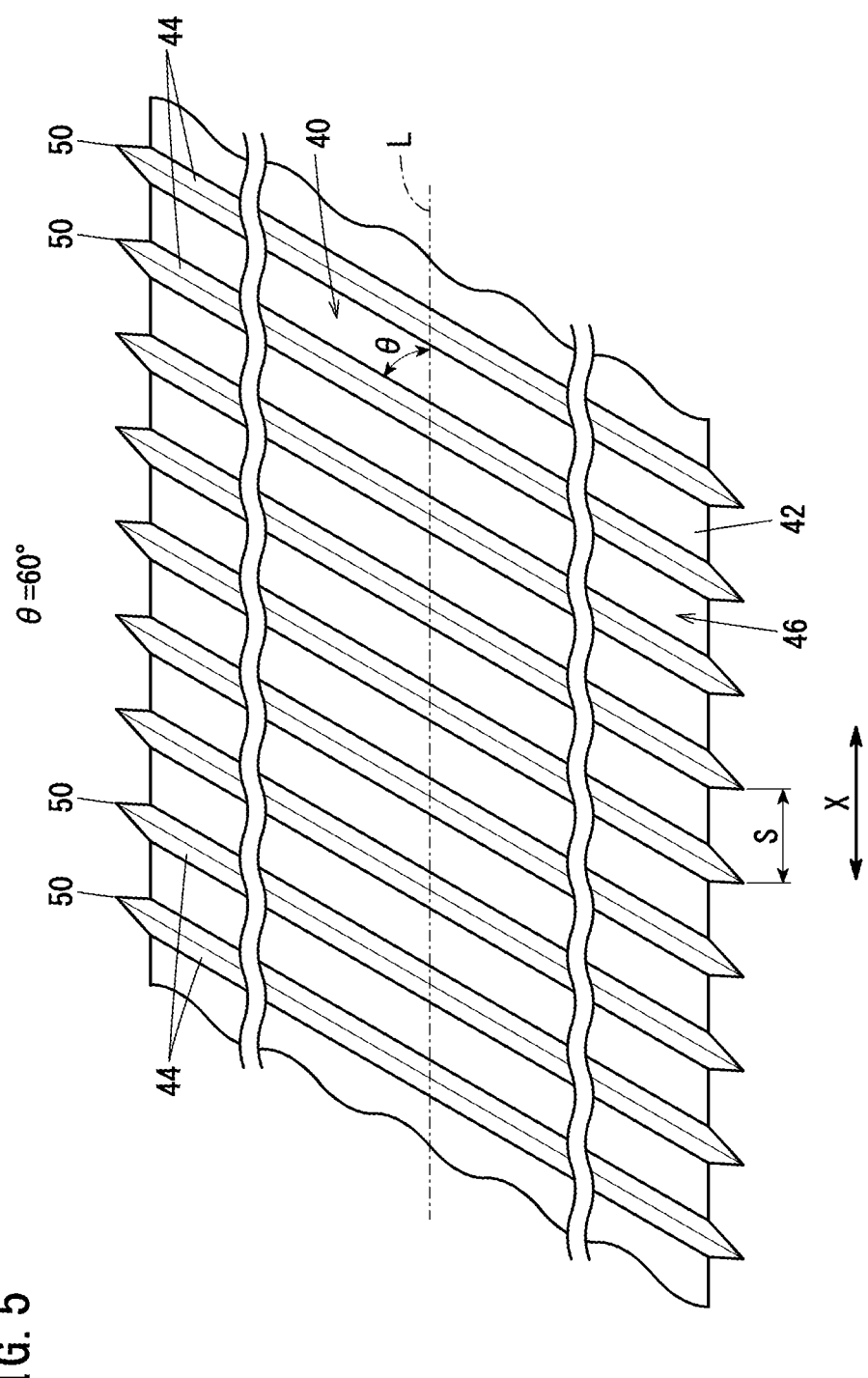
FIG. 5 is still another example of an enlarged view of a main part of the resin coating layer when the rotating shaft of the rotor is viewed in the in the direction orthogonal to the axial direction.

In the embodiments shown in FIGS. 4 and 5, it is also possible to form a ridge structure extending in a spiral shape by forming one convex portion in a spiral shape. Also in this case, when the rotating shaft 18 is viewed in a direction orthogonal to the axial direction, a plurality of ridges 44 appear on the resin coating layer 40. That is, this configuration shows "a plurality of ridges formed from one convex portion". Therefore, this configuration is also included in the "plurality of ridges" in the present specification.

Figure 6:
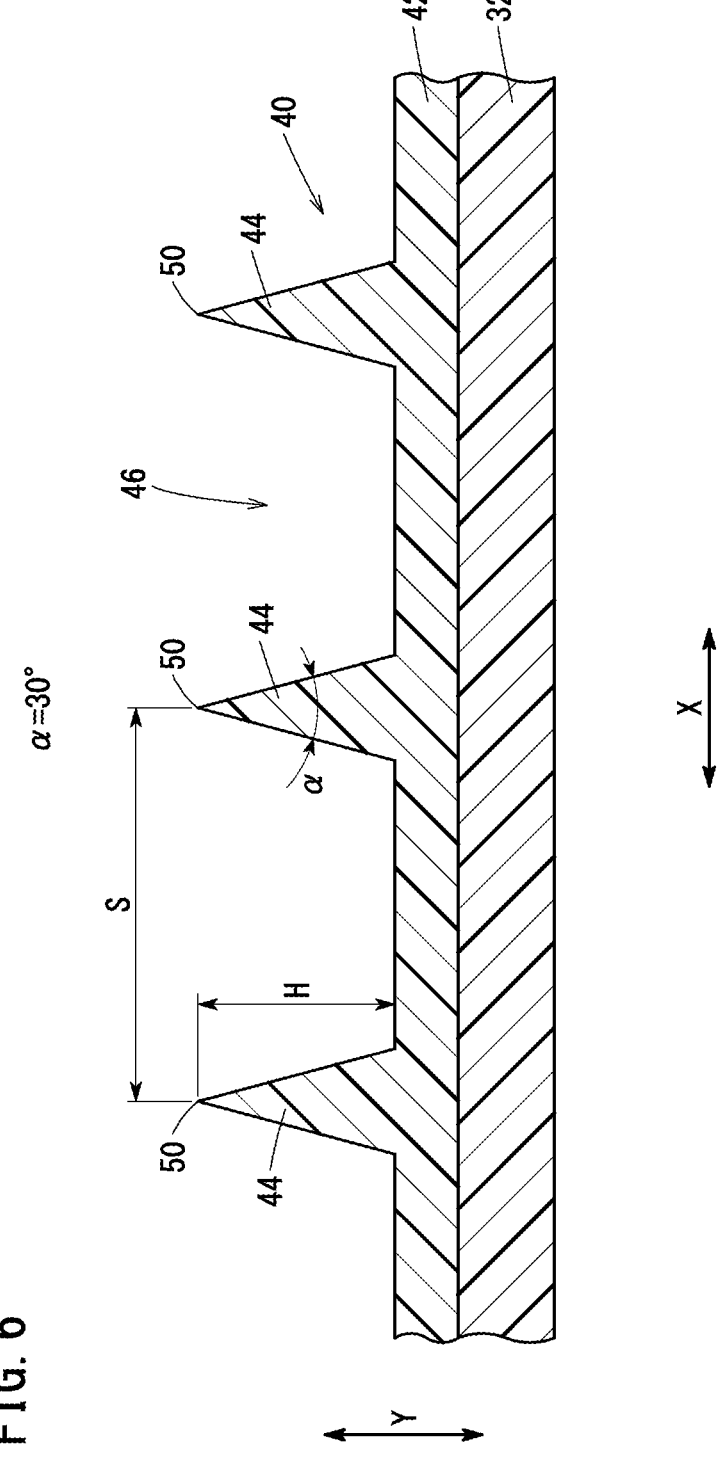
FIG. 6 is an example of a cross-sectional view of ridges formed on the resin coating layer taken along a direction orthogonal to an extending direction of the ridges.

FIG. 6 is a schematic longitudinal sectional view when the sleeve 32 and the resin coating layer 40 are cut along a direction orthogonal to the extending direction of the ridges 44. In the embodiment shown in FIG. 6, the extending direction of the ridges 44 corresponds to the diametrical direction of the rotating shaft 18. The base portion 42 of the resin coating layer 40 is a cylindrical body covering the outer circumferential wall of the sleeve 32.

Figure 7:
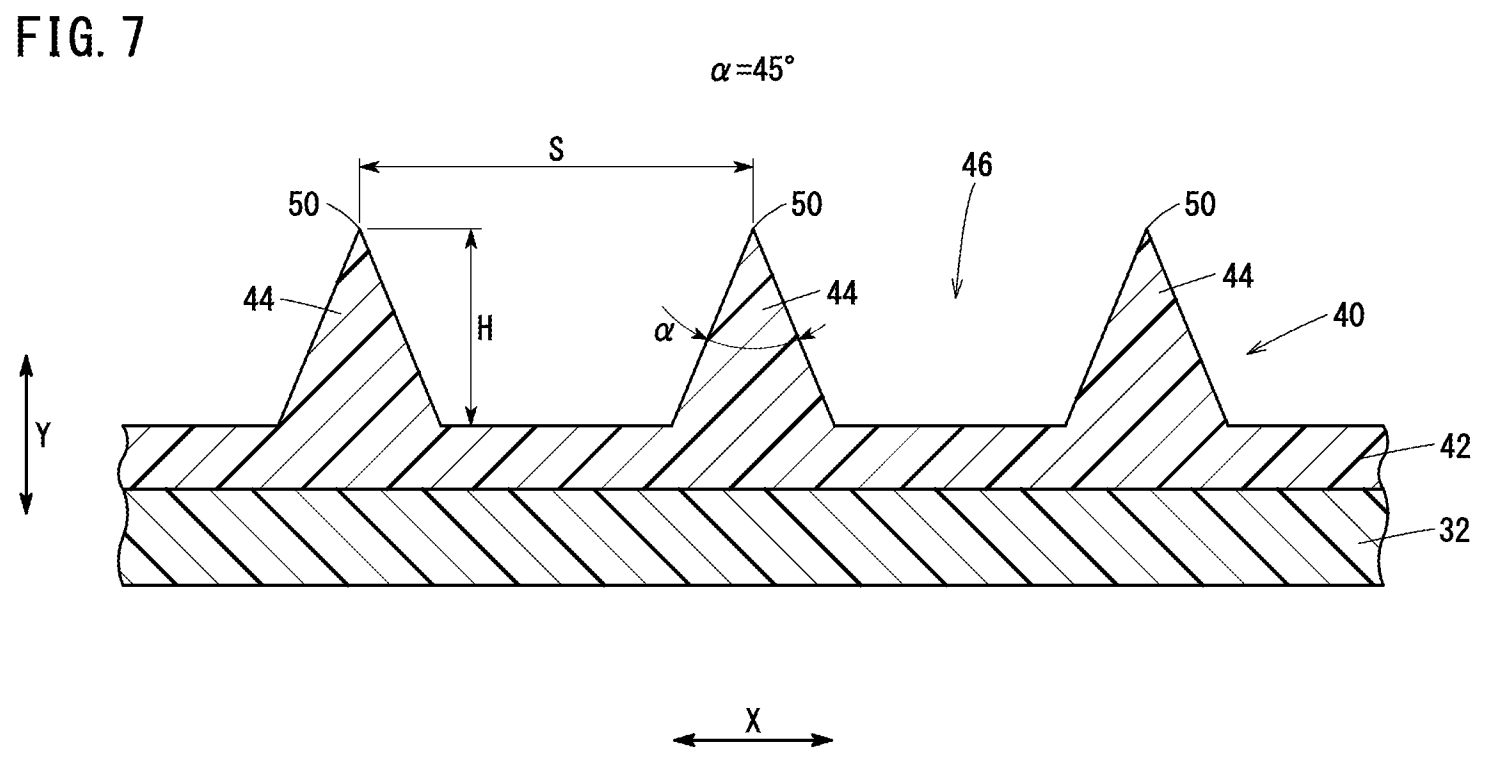
Figure 8:
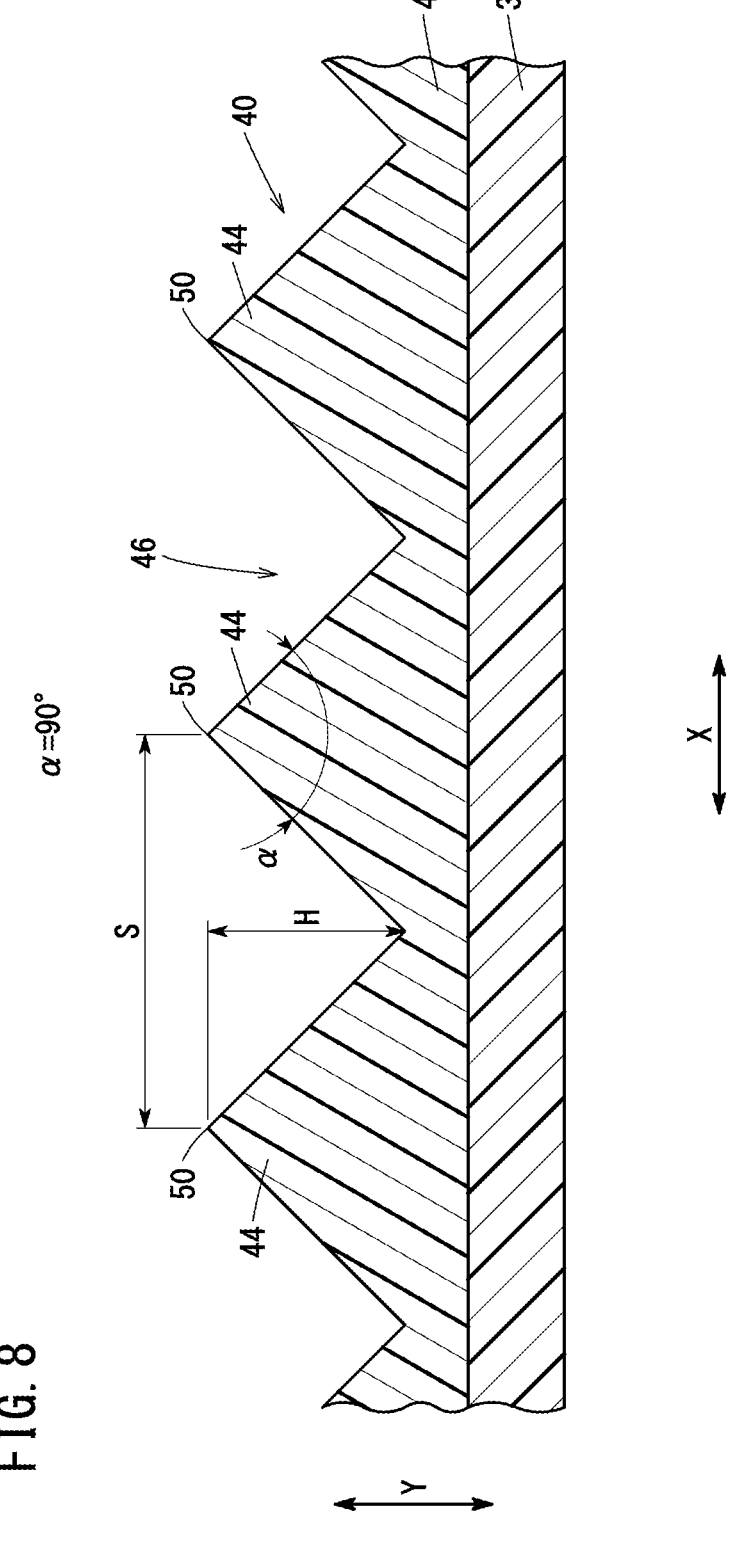
FIG. 8 is still another example of a cross-sectional view of ridges formed on the resin coating layer taken along the direction orthogonal to the extending direction of the ridges.

As shown in FIG. 6, in this case, a cross section along the protruding direction of the ridges 44 appears. The cross-sectional shape of each of the ridges 44 at this time is typically an isosceles triangle. FIG. 6 illustrates a case where a top portion 50 of each of the ridges 44 that protrudes most outward in the diametrical direction of the rotating shaft 18 has an angle α of 30°. However, the angle α is not limited to 30°. As shown in FIG. 7, the angle α may be 45°. As shown in FIG. 8, the angle α may be 90°.

Figure 9:
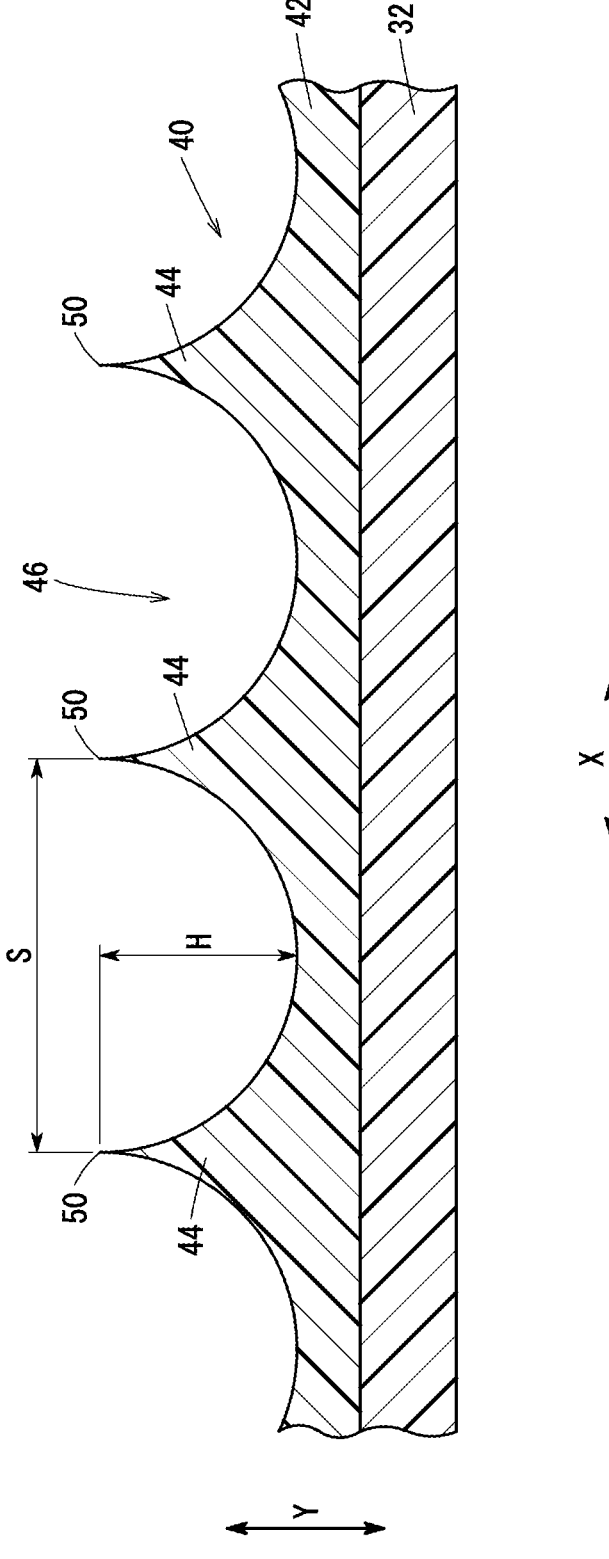
FIG. 9 is still another example of a cross-sectional view of ridges formed on the resin coating layer taken along the direction orthogonal to the extending direction of the ridges.
Figure 10:
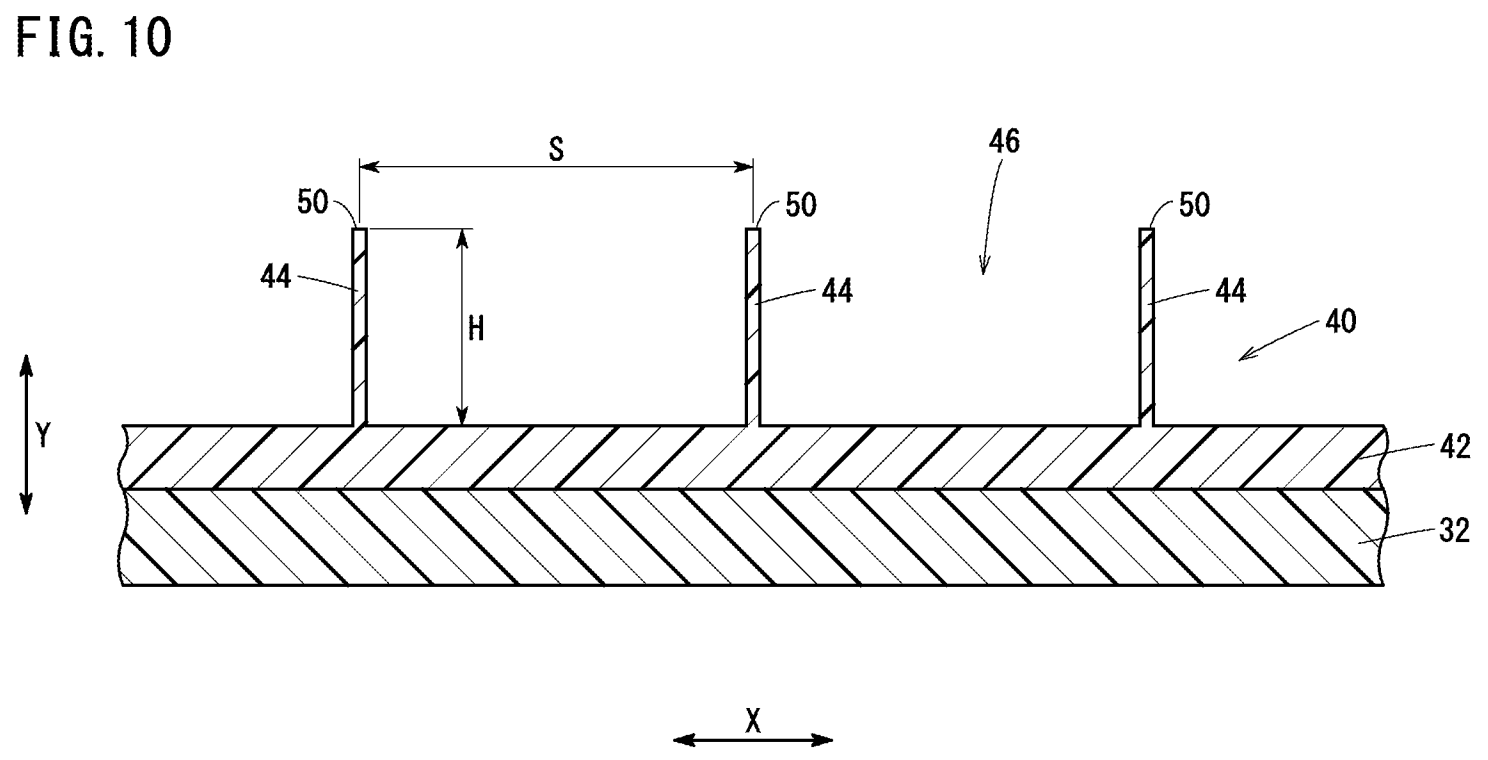

As shown in FIG. 9, the cross-section of the ridges 44 may have a wavy shape with rounded valleys. As shown in FIG. 10, the cross-section of each of the ridges 44 may be columnar (or rod-shaped). As understood with reference to FIGS. 6 to 10, each of the riblets 46 may be any one of a recessed groove having a flat bottom portion (FIGS. 6, 7, and 10), a V-shaped groove (FIG. 8), and a round groove having a bottom portion curved in an arc shape (FIG. 9).

A separation distance S between the top portion 50 of one ridge 44 and the top portion 50 of another ridge 44 adjacent to the one ridge 44 is defined as a pitch. In order to sufficiently suppress windage loss when the rotating shaft 18 rotates at a high speed, the pitch S is preferably 100 μm or less. If the pitch S is excessively small, it is difficult to form the ridges 44. Therefore, the pitch S is preferably in a range of 20 μm to 60 μm.

A protrusion amount H of one of the ridges 44 from the base portion 42 is defined as the height of the one ridge 44 (height H). In order to sufficiently reduce the windage loss while sufficiently increasing the aspect ratio of each of the riblets 46, the height H is preferably 50 μm or less. It is preferable for the height H and the pitch S to satisfy the following equation for the relation therebetween:

$$H=0.5S.$$

In the case that the pitch S is in the range of 20 μm to 60 μm, a preferable range of the height H is 10 μm to 30 μm.

The rotating electric machine 10 having the above-described configuration is mounted on, for example, an aircraft and used as a motor. When the motor is driven, the electromagnetic coil 34 shown in FIG. 1 is energized. With this energization, a magnetic field is formed around the electromagnetic coil 34. By a repulsive force or an attractive force acting between the magnetic field and the permanent magnets 30, the rotating shaft 18 starts to rotate about the axis L. Thus, a flow is generated in the air layer AL between the stator 14 and the resin coating layer 40.

In a flying object, a motor may be required to rotate at a high speed. Here, in the present embodiment, the riblets 46 are formed in the resin coating layer 40 provided on the outer circumferential wall of the sleeve 32. Moreover, the pitch S between two adjacent ridges 44 among the plurality of ridges 44 for forming each of the riblets 46 is preferably 100 μm or less. Therefore, even in the case that the rotating shaft 18 rotates at a high speed, the turbulent vortex generated around the rotor 12 is reduced. As a result, the turbulent flow friction viscosity is lowered and the generation of Taylor vortex is suppressed. For the reasons described above, the windage loss can be reduced.

That is, according to the present embodiment, the windage loss is sufficiently suppressed. Thus, the permanent magnets 30 are prevented from heating up. Therefore, a decrease in the magnetic force of each of the permanent magnets 30 is avoided, so that the energy conversion efficiency in the rotating electric machine 10 is sufficiently increased. That is, the electric energy input to the electromagnetic coil 34 is efficiently converted into the driving force for rotating the rotating shaft 18.

In the case that the rotating electric machine 10 is used as a generator, the driving force for rotating the rotating shaft 18 is efficiently converted into electric energy that is output from the electromagnetic coil 34. As described above, according to the present embodiment, the response characteristic of the rotating electric machine 10 is improved.

In the case that the base resin of the resin coating layer 40 is an epoxy-based resin or a paraxylene-based resin, the resin coating layer 40 exhibits excellent heat resistance. This is because an epoxy-based resin or a paraxylene-based resin is excellent in heat resistance. Therefore, even when the rotor 12 rotates at a high speed, the shape of the ridge 44 is maintained. Moreover, in this case, the resin coating layer 40 is firmly joined to the sleeve 32 made of the carbon fiber reinforced polymer. Therefore, even when the rotor 12 rotates at a high speed, the resin coating layer 40 is prevented from falling off from the sleeve 32. For the reasons described above, even when the rotating electric machine 10 is continuously operated for a long time, it is possible to avoid an increase in windage loss during operation of the rotating electric machine 10.

Figure 11:
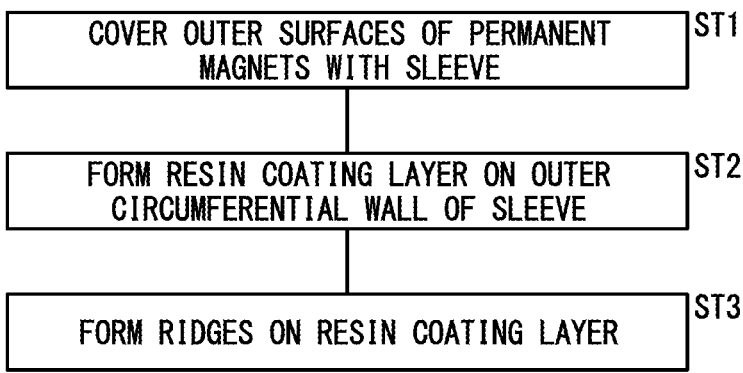
FIG. 11 is a schematic flow of a method for manufacturing a rotor according to an embodiment of the present invention.

Next, a method of manufacturing the rotor 12 constituting the rotating electric machine 10 will be described. FIG. 11 is a schematic flow of the manufacturing method according to the present embodiment. The method of manufacturing the rotor 12 includes a sleeve attaching step ST1, a resin coating step ST2, and a ridge forming step ST3.

Figure 12:
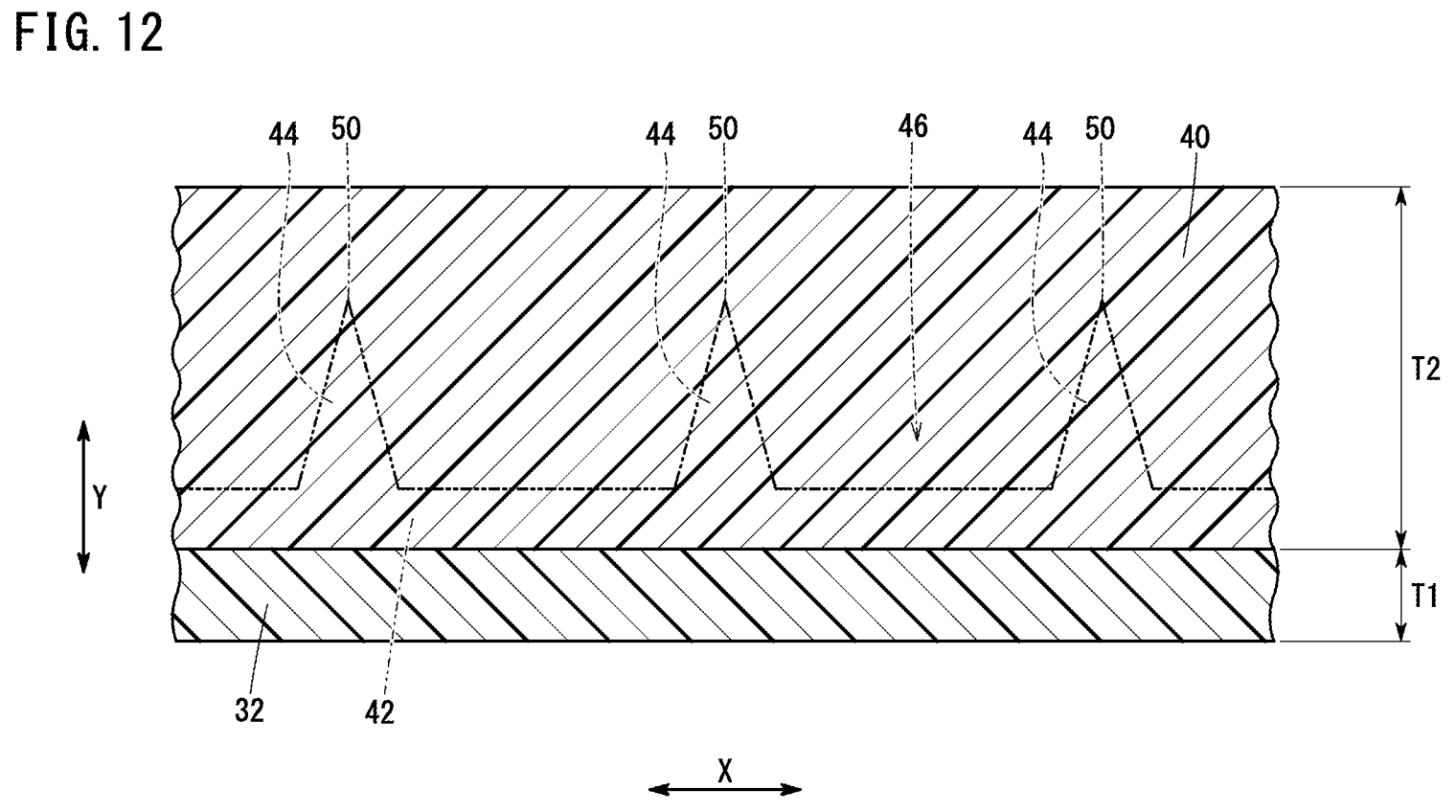

Here, in order to obtain the sleeve 32 made of the carbon fiber reinforced polymer, prepreg is curved into a cylindrical shape and heat is applied to the prepreg in this state. As a result, the matrix resin in the prepreg is cured to obtain the sleeve 32. The thickness T1 of the sleeve 32 shown in FIG. 12 is, for example, about 0.5 mm to 5 mm.

First, in the sleeve attaching step ST1, the outer surfaces of the permanent magnets 30 are covered by the sleeve 32 obtained as described above. That is, the large diameter portion 22 provided with the permanent magnets 30 is inserted into the sleeve 32. As described above, at this time, the sleeve 32 slightly increases in diameter due to elastic deformation, and thereafter slightly decreases in diameter due to elastic restoring force. As a result, the sleeve 32 presses the permanent magnets 30 toward the center of the rotating shaft 18. Accordingly, the permanent magnets 30 are held on the outer circumferential portion of the large diameter portion 22 by the sleeve 32.

Next, the resin coating step ST2 is performed. More specifically, for example, the outer circumferential wall of the sleeve 32 is coated with a resin that causes less wear of a cutting tool than CFRP when machining is performed under the same conditions. Specific examples of such a resin include the above-mentioned epoxy-based resin and paraxylene-based resin. In the case that the matrix resin in the prepreg is the epoxy-based resin, these resins can be easily subjected to machining at the glass transition temperature of the matrix resin (about 180° C.).

Next, heat or the like is applied to the resin coating layer 40. Thus, the resin coating layer 40 is cured. When the base resin of the resin coating layer 40 is an ultraviolet curable resin, the resin coating layer 40 is irradiated with ultraviolet rays. Thus, as shown in FIG. 12, the cured resin coating layer 40 is formed on the outer circumferential wall of the sleeve 32. At this point in time, a thickness T2 of the resin coating layer 40 may be greater than the thickness T1 of the sleeve 32.

Figure 13:
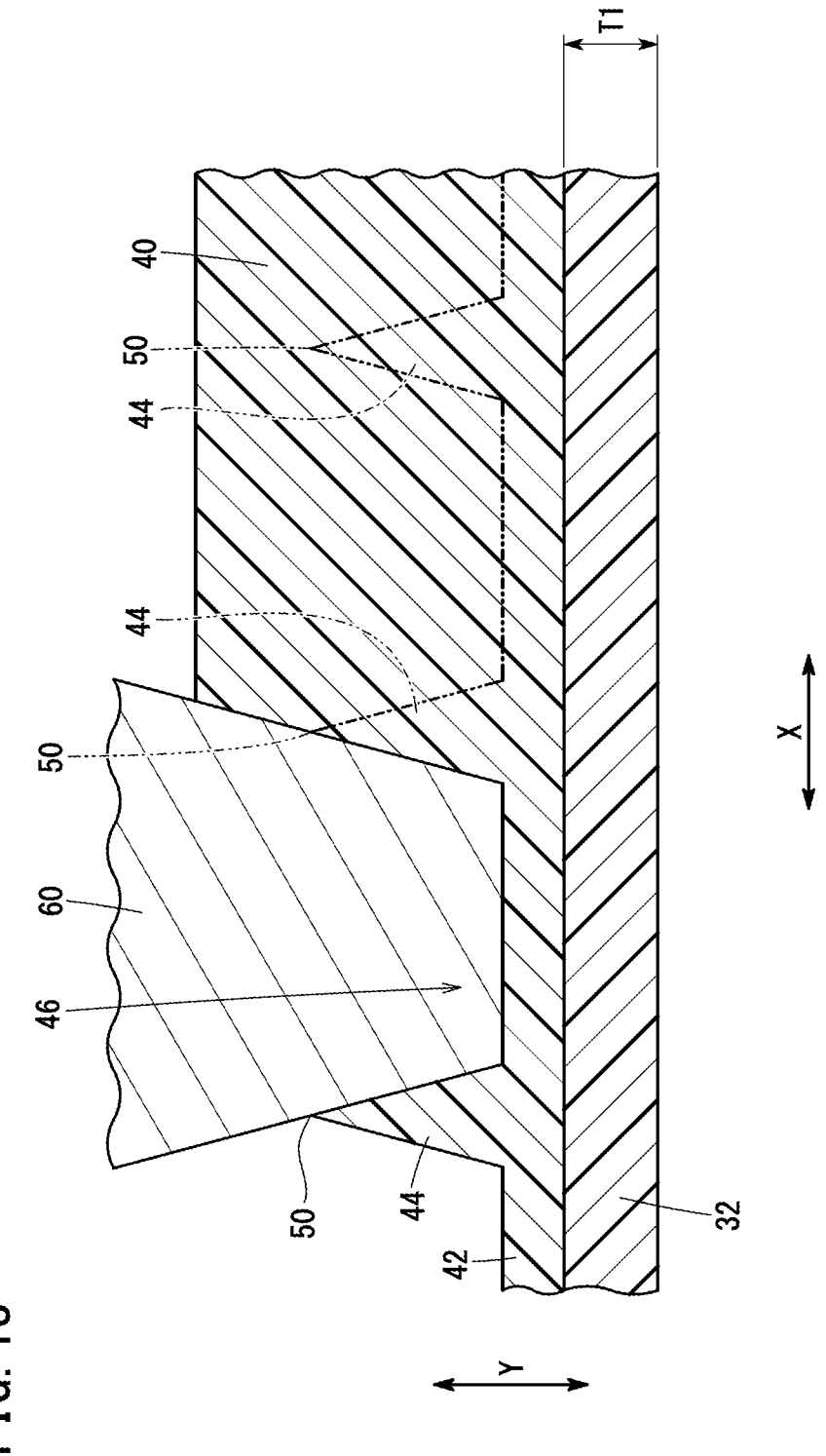
FIG. 13 is a cross-sectional view showing of a main part in a state in which ridges are formed on the resin coating layer.

Next, the ridge forming step ST3 is performed. In the present embodiment, as shown in FIG. 13, machining is performed on the resin coating layer 40. Examples of a cutting tool 60 used at this time include a cemented carbide tool, a cubic boron nitride (c-BN) tool, and a single crystal diamond tool, and the single crystal diamond tool is particularly preferable. In this case, the ridges 44 having good dimensional accuracy can be easily obtained by machining, and wear is relatively small even if machining is repeated.

In the case that the base resin of the resin coating layer 40 is an epoxy-based resin or a paraxylene-based resin, it is easy to perform machining on the resin coating layer 40, as described above. Even in the case that the resin coating layer 40 has a large thickness T2, it is easy to perform machining on the resin coating layer 40. In addition, according to the machining, it is possible to obtain the ridges 44 having good dimensional accuracy at low cost, as compared with other processing methods.

The machining is performed while rotating the rotating shaft 18 on which the resin coating layer 40 is formed, about the axis L (see FIG. 1). In this case, if an intersection angle θ between the extending direction of the ridges 44 and the axial direction of the rotating shaft 18 is less than 45°, it is not easy for the cutting tool 60 to advance in the cutting direction. Therefore, the intersection angle θ is preferably 45° or more. In other words, by setting the intersection angle θ to 45° to 90°, it is possible to easily form the ridges 44 by machining. The intersection angle θ may take a value such as 90° shown in FIG. 3, 75° shown in FIG. 4, or 60° shown in FIG. 5.

In addition, it is preferable to form each of the ridges 44 so as to obtain a triangular cross section (see FIGS. 6 to 8) in which the angle α of the top portion 50 is 30° to 90°. Alternatively, as shown in FIG. 9, it is also possible to form the ridges 44 having a wave-shaped cross section so that the riblets 46 are round grooves. The ridges 44 each having such a cross-sectional shape can be easily formed by machining or the like. As shown in FIG. 10, the ridges 44 each having a columnar (or rod shaped) cross section may be formed.

Further, the machining is performed such that the pitch S (see FIGS. 6 to 10) between two adjacent ridges 44 is preferably 100 μm or less, more preferably 60 μm. However, it is not easy to reduce the pitch S to less than 10 μm by machining. Therefore, the pitch S is preferably in the range of 20 μm to 60 μm.

Furthermore, the machining is performed such that the height H of the ridges 44 is 50 μm or less and preferably 0.5 times the pitch S. By setting the pitch S and the height H to the above-described values, the windage loss can be sufficiently suppressed even when the rotor 12 is rotated at a high speed.

The riblets 46 are formed by forming the ridges 44 on the outer circumferential wall of the base portion 42 as described above. The riblets 46 each have a relatively recessed shape relative to the ridges 44.

Alternatively, laser processing, polishing, or the like may be performed in the ridge forming step ST3. In the case of laser processing, polishing, or the like, the processing speed can be relatively high.

As described above, the present embodiment discloses the rotating electric machine (10) including the rotor (12) and the stator (14), the rotor including the rotating shaft (18) and the permanent magnet (30) held on the rotating shaft, and the stator including the electromagnetic coil (34) surrounding the permanent magnet, wherein the rotor includes the sleeve (32) covering an outer surface of the permanent magnet on the rotating shaft and being spaced apart from the stator by the predetermined distance, and the resin coating layer (40) provided on the outer circumferential wall of the sleeve, and wherein the sleeve is made of the carbon fiber reinforced polymer, the resin coating layer includes the base portion (42) covering the outer circumferential wall of the sleeve and the ridge structure protruding from the outer circumferential wall of the base portion, the ridge structure includes the one or plurality of convex portions forming the plurality of ridges (44) extending parallel to each other, and the riblet (46) recessed relative to the plurality of ridges is formed between the plurality of ridges.

The riblet is formed between two ridges adjacent to each other. The riblet reduces the turbulent vortex generated around the rotor even when the rotor rotates at a high speed. As a result, the turbulent friction viscosity is lowered and the generation of the Taylor vortex is suppressed. For the reasons described above, the windage loss can be reduced.

As a result, the permanent magnet is prevented from heating up. Therefore, a decrease in the magnetic force of the permanent magnet is avoided, so that the energy conversion efficiency in the rotating electric machine is sufficiently increased.

The present embodiment discloses the method of manufacturing the rotor (12) that includes the rotating shaft (18) and the permanent magnet (30) held on the rotating shaft and is surrounded by the stator (14) in the rotating electric machine (10). The method includes the sleeve attaching step (ST1) of covering an outer surface of the permanent magnet by the sleeve (32) made of the carbon fiber reinforced polymer, the resin coating step (ST2) of coating the outer circumferential wall of the sleeve with the resin coating layer (40), and the ridge forming step (ST3) of forming, in the resin coating layer, the base portion (42) covering the outer circumferential wall of the sleeve and the ridge structure protruding from the outer circumferential wall of the base portion, by processing and removing the part of the outer circumferential wall of the resin coating layer, wherein in the ridge forming step, the ridge structure is provided as the one or plurality of convex portions forming the plurality of ridges (44) that extend in parallel to each other, thereby forming the riblet (46) recessed relative to the plurality of ridges.

In the present embodiment, the sleeve is made of carbon fiber reinforced polymer. Also, the sleeve is generally thin-walled. In general, it is difficult to perform processing such as machining on the thin carbon fiber reinforced polymer. Therefore, it is not easy to form the ridge on the outer circumferential wall of the sleeve.

On the other hand, in the present embodiment, the sleeve is coated with the resin coating layer, and the resin coating layer is formed with the ridges. For example, by forming the resin coating layer with a large thickness, the ridges can be easily formed by performing machining on the resin coating layer. Further, since it is not necessary to perform processing such as machining on the sleeve, it is possible to avoid occurrence of breakage such as cracking in the sleeve.

The present embodiment discloses the rotating electric machine, wherein the extending direction of the plurality of ridges is the direction intersecting the axial direction (X) of the rotating shaft at the angle (θ) of 45° to 90°.

The present embodiment discloses the method of manufacturing the rotor, wherein in the ridge forming step, the plurality of ridges are formed so as to extend in the direction intersecting the axial direction (X) of the rotating shaft at the angle (θ) of 45° to 90°.

The ridges are formed by, for example, performing machining on the resin coating layer while rotating the rotating shaft. In such machining, it is easy to form the ridges extending in the above-described direction. That is, in this case, the ridges can be easily formed.

The present embodiment discloses the rotating electric machine, wherein when the height of each of the plurality of ridges is H and the pitch between two adjacent ridges among the plurality of ridges is S, S is 100 μm or less and the following equation is satisfied:

$$H=0.5S.$$

The present embodiment discloses the method of manufacturing the rotor, wherein when the height of each of the plurality of ridges is H and the pitch between two adjacent ridges among the plurality of ridges is S, the plurality of ridges are formed so as to satisfy the following equation in the ridge forming step:

$$H=0.5S.$$

By setting the pitch S to 100 μm or less, the windage loss can be sufficiently reduced even when the rotor rotates at a high speed. In addition, by setting the height H to ½ times the pitch S, the aspect ratio of the riblet becomes sufficiently large. This also makes it possible to sufficiently reduce windage loss when the rotor rotates at a high speed.

The present embodiment discloses the rotating electric machine, wherein when the plurality of ridges are cut in the direction orthogonal to the extending direction of the plurality of ridges, the cross-sectional shape of each of the plurality of ridges is a triangle.

The present embodiment discloses the method of manufacturing the rotor, wherein when the plurality of ridges are cut in the direction orthogonal to the extending direction of the plurality of ridges, the plurality of ridges are formed in the ridge forming step, in the manner so that the cross-sectional shape of each of the plurality of ridges is a triangle.

When the cross-sectional shape is a triangle, the ridges can be formed more easily than ridges having another cross-sectional shape.

The present embodiment discloses the rotating electric machine, wherein when the plurality of ridges are cut in the direction orthogonal to the extending direction of the plurality of ridges, the top portion (50) in the cross section of each of the ridges has the angle (α) of 30° to 90°, the top portion protruding most outward in the diametrical direction of the rotating shaft.

The present embodiment discloses the method of manufacturing the rotor, wherein when the plurality of ridges are cut in the direction orthogonal to the extending direction of the plurality of ridges, the plurality of ridges are formed in the ridge forming step, in the manner so that the top portion (50) in the cross section of each of the ridges has the angle (α) of 30° to 90°, the top portion protruding most outward in the diametrical direction of the rotating shaft.

By setting the angle of the top portion to be within such a range, the ridges can be formed more easily than each of the ridges whose top portion has an angle outside the above-described range.

The present embodiment discloses the method of manufacturing the rotor, wherein in the ridge forming step, the part of the outer circumferential wall of the resin coating layer is removed by machining.

According to machining, it is possible to easily form the ridges having good dimensional accuracy at low cost.

The present embodiment discloses the rotating electric machine, wherein the base material resin of the resin coating layer is formed of the resin that causes less wear of the cutting tool than the carbon fiber reinforced polymer when machining is performed on the base material resin and the carbon fiber reinforced polymer under the same condition.

The present embodiment discloses the method of manufacturing the rotor, wherein the resin coating step is performed to form the resin coating layer by using, as the base material resin of the resin coating layer, the resin that causes less wear of the cutting tool than the carbon fiber reinforced polymer when machining is performed on the base material resin and the carbon fiber reinforced polymer under the same condition.

In this case, the ridges can be easily formed by performing machining on the resin coating layer.

The present embodiment discloses the rotating electric machine, wherein the base material resin is the epoxy-based resin or the paraxylene-based resin.

The present embodiment discloses the method of manufacturing the rotor, wherein the epoxy-based resin or the paraxylene-based resin is used as the base material resin.

The epoxy-based resin or the paraxylene-based resin is an easily-processable (or tractable) resin. For this reason, since it is easy to perform machining on the resin coating layer, it is easy to form regular ridges having a predetermined pitch and height. In addition, the epoxy-based resin or the paraxylene-based resin has excellent heat resistance. Therefore, even when the rotor rotates at a high speed, the shape of the ridges is maintained. Further, if the base material resin is an epoxy-based resin or a paraxylene-based resin, the resin coating layer is firmly joined to the sleeve made of the carbon fiber reinforced polymer. Therefore, even when the rotor rotates at a high speed, the resin coating layer is prevented from falling off from the sleeve.

Moreover, it should be noted that the present invention is not limited to the disclosure described above, but various configurations may be adopted therein without departing from the essence and gist of the present invention.

The invention claimed is:

1. A method of manufacturing a rotor that includes a rotating shaft and a permanent magnet held on the rotating shaft and is surrounded by a stator in a rotating electric machine, the method comprising:

covering an outer surface of the permanent magnet with a sleeve made of a carbon fiber reinforced polymer to attach the sleeve;

coating an outer circumferential wall of the sleeve with a resin coating layer; and forming, in the resin coating layer, a base portion constituted by a cylindrical body covering the outer circumferential wall of the sleeve and a ridge structure protruding from an outer circumferential wall of the base portion, by processing and removing a part of an outer circumferential wall of the resin coating layer, wherein in the forming of the base portion and the ridge structure, by machining and removing the part of the outer circumferential wall of the resin coating layer the ridge structure is provided as one or a plurality of convex portions forming a plurality of ridges that extend in parallel to each other, thereby forming a riblet recessed relative to the plurality of ridges, and wherein a sum of a thickness of the base portion formed by machining the resin coating layer and a thickness of each of the plurality of ridges is smaller than a pre-machining thickness of the resin coating layer.

2. The method of manufacturing the rotor according to claim 1, wherein in the forming of the base portion and the ridge structure, the plurality of ridges are formed so as to extend in a direction intersecting an axial direction of the rotating shaft at an angle of 45° to 90°.

3. The method of manufacturing the rotor according to claim 1, wherein when a height of each of the plurality of ridges is H and a pitch between two adjacent ridges among the plurality of ridges is S, the plurality of ridges are formed so as to satisfy a following equation in the forming of the base portion and the ridge structure:

$$H=0.5S.$$

4. The method of manufacturing the rotor according to claim 1, wherein when the plurality of ridges are cut in a direction orthogonal to an extending direction of the plurality of ridges, the plurality of ridges are formed in the forming of the base portion and the ridge structure, in a manner so that a cross-sectional shape of each of the plurality of ridges is a triangle.

5. The method of manufacturing the rotor according to claim 4, wherein when the plurality of ridges are cut in the direction orthogonal to the extending direction of the plurality of ridges, the plurality of ridges are formed in the forming of the base portion and the ridge structure, in a manner so that a top portion in a cross section of each of the ridges has an angle of 30° to 90°, the top portion protruding most outward in a diametrical direction of the rotating shaft.

6. The method of manufacturing the rotor according to claim 1, wherein the coating with the resin coating layer is performed to form the resin coating layer by using, as a base material resin of the resin coating layer, a resin that causes less wear of a cutting tool when machining is performed on the base material resin compared to wear of the cutting tool when machining is performed on the carbon fiber reinforced polymer under a same machining condition.

7. The method of manufacturing the rotor according to claim 6, wherein an epoxy-based resin or a paraxylene-based resin is used as the base material resin.

8. The method of manufacturing the rotor according to claim 1, wherein in the forming of the base portion and the ridge structure, a cutting tool having a shape that is capable of forming the base portion and the plurality of ridges is provided.

* * * * *